(12) United States Patent
Kurth

(10) Patent No.: US 11,903,002 B2
(45) Date of Patent: Feb. 13, 2024

(54) FLEXIBLE NB-IOT MULTI-CARRIER OPERATION ACROSS RADIO FREQUENCY BANDS

(71) Applicant: Shenzhen Goodix Technology Co., Ltd., Guangdong (CN)

(72) Inventor: Mathias Kurth, Dresden (DE)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 507 days.

(21) Appl. No.: 17/155,560

(22) Filed: Jan. 22, 2021

(65) Prior Publication Data
US 2021/0144721 A1     May 13, 2021

Related U.S. Application Data

(63) Continuation of application No. PCT/EP2018/069898, filed on Jul. 23, 2018.

(51) Int. Cl.
*H04W 4/00*     (2018.01)
*H04W 72/53*     (2023.01)
(Continued)

(52) U.S. Cl.
CPC ............. *H04W 72/53* (2023.01); *H04W 4/80* (2018.02); *H04W 24/10* (2013.01);
(Continued)

(58) Field of Classification Search
CPC ....... H04W 72/53; H04W 4/80; H04W 76/11; H04W 72/23; H04W 24/10; H04W 52/146; H04W 72/0453
See application file for complete search history.

(56) References Cited

U.S. PATENT DOCUMENTS

2005/0282574 A1* 12/2005 Li .................... H04W 52/245
                                                                                       455/69
2011/0103243 A1     5/2011 Larsson et al.
(Continued)

FOREIGN PATENT DOCUMENTS

CN     1734976 A     2/2006
CN     101998523 A     3/2011
(Continued)

OTHER PUBLICATIONS

Ericsson, 3GPP TSG-RAN2 Meeting #101 "Measurement reporting in NB-IoT", Mar. 2, 2018, R2-1802570 (Year: 2018).*
(Continued)

*Primary Examiner* — Siren Wei
(74) *Attorney, Agent, or Firm* — Maier & Maier, PLLC

(57) ABSTRACT

A method for improving NarrowBand Internet-of-Things radio network utilization by more efficiently and flexibly allocating available frequency spectrum resources to an UE. The objective to provide a method which allows efficient NB-IoT multi-carrier operation across different radio frequency bands or NB-IoT/LTE mother cells will be solved by a method for improving NarrowBand Internet of Things (NB-IoT) radio network utilization by more efficiently and flexibly allocating available frequency spectrum resources to an UE, where system information messages and/or dedicated signaling exchanged between an eNodeB and the UE are extended by specific parameters, setups and requests, so that multi-carrier operations are performable across all radio frequency bands even if the UE is already connected to the eNodeB.

19 Claims, 1 Drawing Sheet

(51) Int. Cl.
H04W 4/80 (2018.01)
H04W 76/11 (2018.01)
H04W 24/10 (2009.01)
H04W 52/14 (2009.01)
H04W 72/0453 (2023.01)
H04W 72/23 (2023.01)

(52) U.S. Cl.
CPC ..... H04W 52/146 (2013.01); H04W 72/0453 (2013.01); H04W 72/23 (2023.01); H04W 76/11 (2018.02)

(56) References Cited

U.S. PATENT DOCUMENTS

| | | | |
|---|---|---|---|
| 2011/0292812 | A1 | 12/2011 | Kim et al. |
| 2013/0301565 | A1 | 11/2013 | Xu et al. |
| 2014/0023016 | A1 | 1/2014 | Mildh et al. |
| 2014/0254521 | A1 | 9/2014 | Fong et al. |
| 2015/0124748 | A1 | 5/2015 | Park et al. |
| 2016/0112965 | A1 | 4/2016 | Damnjanovic et al. |
| 2016/0242064 | A1 | 8/2016 | Lee et al. |
| 2017/0238284 | A1 | 8/2017 | Tseng et al. |
| 2017/0251455 | A1* | 8/2017 | Shin ...................... H04L 5/0098 |
| 2018/0020432 | A1 | 1/2018 | Rico Alvarino et al. |
| 2020/0367168 | A1* | 11/2020 | Hwang ............. H04W 52/0229 |
| 2021/0105819 | A1* | 4/2021 | Takeda .............. H04W 74/0833 |
| 2021/0307059 | A1* | 9/2021 | Rathonyi .......... H04W 74/0833 |

FOREIGN PATENT DOCUMENTS

| | | |
|---|---|---|
| CN | 103718639 A | 4/2014 |
| CN | 107046707 A | 8/2017 |
| CN | 107734667 A | 2/2018 |
| WO | 2010083656 A1 | 7/2010 |
| WO | 2011154030 A2 | 12/2011 |
| WO | 2017133550 A1 | 8/2017 |
| WO | 2017192624 A1 | 11/2017 |
| WO | 2018027906 A | 2/2018 |

OTHER PUBLICATIONS

European Communication dated Dec. 10, 2020 in corresponding application No. 18152883.7; 7 pgs.
Partial European Search Report dated Jun. 27, 2018 in corresponding application No. 18152883.7; 18 pgs.
Extended European Search Report dated Oct. 9, 2018 in corresponding application No. 18152883.7; 25 pgs.
International Search Report and Written Opinion dated Mar. 7, 2019 in corresponding International Application No. PCT/EP2018/069898; 17 pages.
Ericsson: Measurement reporting in Nb-Iot, 3GPP Draft; R2-1802570 Measurement Reporting in NB- IoT, 3rd Generation Partnership Project . (3GPP), Mobile Competence Centre; 650, Route Des Lucioles; F-06921 Sophia-Antipolis Cedex; France, vol. 1 RAN WG2, No. Athens, Greece; Feb. 26, 2018-Mar. 2, 2018, Feb. 16, 2018 (Feb. 16, 2018), XP051400188, Retrieved from the Internet:URL:http://www.3gpp.org/ftp/tsg%5Fran/WG2%5FRL2/TSGR2%5F101/Docs/.
Ericsson et al.: "NB-IoT—Measurements in connected mode", 3GPP Draft; R2-156172 NB-IoT—Measurements in Connected Mode, 3rd Generation Partnership Project (3GPP), Mobile Competence Centre ; 650, Route Des Lucioles ; F-06921 Sophia-Antipolis Cedex ; France, vol. RAN WG2, No. Anaheim, US; Nov. 16, 2015-Nov. 20, 2015, Nov. 16, 2015 (Nov. 16, 2015), XP051005702, Retrieved from the Internet: URL:http://www.3gpp.org/ftp/Meetings_3GPP_SVNC/RAN2/Docs/.
Intel Corporation: "Remaining details of NB-IoT multi-carrier operation", 3GPP Draft; R1-161893—Intel Mco, 3rd Generation Partnership Project (3GPP), Mobile Competence Centre; 650, Route Des Lucioles; F-06921 Sophia-Antipolis Cedex; France, vol. RAN WG1, No. Sophia Antipolis, France; Mar. 22, 2016-Mar. 24, 2016, Mar. 16, 2016 (Mar. 16, 2016), XP051081010, Retrieved from the Internet: URL:http://www.3gpp.org/ftp/tsg_ran/WG1_RL1/TSGR1_AH/LTE_NB-IoT_1603/Docs/.
ZTE: Analysis for Load Distribution in NB-IoT, 3GPP Draft; R2-160413 NB-IoT Load Distribution Discussion Final, 3rd Generation Partnership Project (3GPP), Mobile Competence Centre; 650, Route Des Lucioles ; F-06921 Sophia-Antipolis Cedex; France, vol. RAN WG2, No. Budapest, HU; Jan. 19, 2016-Jan. 21, 2016, Jan. 18, 2016 (Jan. 18, 2016), XP051054703, Retrieved from the Internet: URL:http://www.3gpp.org/ftp/Meetings_3GPP_SYNC/RAN2/Docs/.
Intel Corporation: "Cell selection and load distribution for Nb-Iot", 3GPP Draft; R2-161260 NB-IoT- Idlemobility Intelv05, 3rd Generation Partnership Project (3GPP), Mobile Competence Centre; 650, Route Des Lucioles ; F-06921 Sophia-Antipolis Cedex ; France, vol. RAN WG2, No. St Julian, Malta; Feb. 15, 2016-Feb. 19, 2016, Feb. 14, 2016 (Feb. 14, 2016), XP051055202, Retrieved from the Internet: URL:http://www.3gpp.org/ftp/Meetings_3GPP_SYNC/RAN2/Docs/.
Huawei et al.: "NPRACH on Non-anchor NB-IoT Carrier", 3GPP Draft; R2-165533 NPRACH On Non-Anchor NB-IoT Carrier, 3rd Generation Partnership Project (3GPP), Mobile Competence Centre; 650, Route Des Lucioles ; F-06921 Sophia-Antipolis Cedex ; France, vol. RAN WG2, No. Gothenburg, Sweden; Aug. 22, 2016-Aug. 26, 2016, Aug. 21, 2016 (Aug. 21, 2016), XP051126993, Retrieved from the Internet: URL:http://www.3gpp.org/ftp/Meetings_3GPP_SYNC/RAN2/Docs.
Nokia Networks et al.: "NB-IoT Operation in Multiple PRBs", 3GPP Draft; RI-160447, 3rd Generation Partnership Project (3GPP), Mobile Competence Centre; 650, Route Des Lucioles; F-06921 Sophia-Antipolis Cedex ; France, vol. RAN WG1, No. St Julian's, Malta; Feb. 15, 2016-Feb. 19, 2016, Feb. 5, 2016 (Feb. 5, 2016), XP051063773, Retrieved from the Internet: URL:http://www.3gpp.org/ftp/tsg_ran/WGI_RL1/TSGRI 84/Docs/.
Huawei: "Corrections to NB-IoT General", 3GPP Draft; R2-164941 Corrections To NB-IoT General In 36.300, 3rd Generation Partnership Project (3GPP), Mobile Competence Centre; 650, Route Des Lucioles; F-06921 Sophia-Antipolis Cedex ; France, vol. RAN WG2, No. Gothenburg, Sweden; Aug. 22, 2016-Aug. 26, 2016, Aug. 21, 2016 (Aug. 21, 2016), XP051126607, Retrieved from the Internet: URL:http://www.3gpp.org/ftp/Meetings_3GPP_SYNC/RAN2/Docs/.
Ericsson: "UE Reconfiguration to a Non-Anchor Carrier in NB-IoT", 3GPP Draft; R2-162769—UE Reconfiguration To a Non-Anchor Carrier, 3rd Generation Partnership Project (3GPP), Mobile Competence Centre; 650, Route Des Lucioles ; F-06921 Sophia-Antipolis Cedex; Fra, vol. RAN WG2, No. Dubrovnik, Croatia; Apr. 11, 2016-Apr. 15, 2016, Apr. 2, 2016 (Apr. 2, 2016), XP051082541, Retrieved from the Internet: URL:http://www.3gpp.org/ftp/tsg_ran/WG2_RL2/TSGR2_93bis/Docs/.
Office Action dated Feb. 28, 2023, in corresponding Chinese Application No. 201880025223.X, 11 pages, partial English translation provided.
Decision to Grant a European Patent dated Jan. 5, 2023, in corresponding European Application No. 18152883.7, 2 pages.
Office Action Action dated Jun. 29, 2023, in corresponding Chinese Application No. 201880025223.X, 13 pages.
Nokia, "Remaining Stage-3 aspects of Idle mode measurements" 3GGP TSG-RAN WG2 #101, Athens, Greece, Feb. 26-Mar. 2, 2018, R2-1802752, 5 pages.

* cited by examiner

FLEXIBLE NB-IOT MULTI-CARRIER OPERATION ACROSS RADIO FREQUENCY BANDS

CROSS-REFERENCE TO RELATED APPLICATIONS

This application is a continuation of International Application No. PCT/EP2018/069898, filed on Jul. 23, 2018, which is hereby incorporated by reference in their entireties.

TECHNICAL FIELD

The disclosure relates to a method for improving NarrowBand Internet-of-Things radio network utilization by more efficiently and flexibly allocating available frequency spectrum resources to an UE.

BACKGROUND

NarrowBand Internet-of-Things (NB-IoT) is a recently ratified 3GPP standard for the radio interface between base station (eNodeB) and user equipment (UE). It can be deployed in a standalone fashion in refarmed GSM spectrum. Furthermore, it can share spectrum resources with a FD-LTE (Frequency Division Long Term Evolution) cell, either within the LTE band as well as within the LTE guard band. The objectives of the standard are the power efficient transport of infrequent small data with battery lifetimes of up to 10 years, extension of the cellular coverage, the support of a large number of devices within a cell as well as low complex devices with low costs [Reference: 3GPP TS 23.720 Study on architecture enhancements for Cellular Internet of Things].

As the characteristic traffic pattern, an IoT device generally generates small amounts of data in an infrequent fashion, either periodically or triggered by external events. At that time, the device becomes active (enters connected mode) and reports the data to the network. Thereafter, it enters idle mode where it is monitoring the signal conditions in-between the sleep cycle. In order to achieve a battery lifetime of many years, the sleep cycles within NB-IoT are extended to hours and days. The mobility in idle mode is controlled by the UE according to priorities given by the network. Since the priorities affect all UEs in the same way, it is generally not possible to evenly distribute the UEs across the available NB-IoT frequency layers. Since the frequency layer the NB-IoT is camped on in idle mode will be used to initiate the connection establishment to enter connected mode, it can be expected that one frequency layer will get congested whereas the remaining layers will be underutilized. A frequency layer is the same as a "RF channel" or "RF carrier". Multiple frequency layers might be within a radio frequency band in the sense of this disclosure.

The NB-IoT standard does not define connected mode mobility in order to keep the complexity of the device low. Once the connection to the eNodeB has been established, the UE cannot be handed over to another cell without interrupting the connection. For allocating the UE to another carrier frequency of another radio frequency band, the NB-IoT standard defines two procedures: the multi-carrier operation and redirection [Reference: 3GPP TS 36.300 E-UTRA and E-UTRAN—Overall Description, Release 13]. When multi-carrier operation is configured in connected mode via dedicated signaling from the eNodeB, all unicast communication towards UE is taking place on the configured carrier. Furthermore, the eNodeB can redirect the UE to another carrier frequency within a connection release.

Due to the missing connected mode mobility in NB-IoT, an efficient use of multiple frequency layers is not possible. Using redirection, the eNodeB can redirect the UE to any other carrier frequency. The redirection procedure requires, however, an additional connection establishment after the connection release, which is not efficient in terms of UE power consumption. When using the multi-carrier operation, on the other hand, then some parts of the frequency spectrum allocated to NB-IoT will become congested whereas others remain underutilized. The reason is that the UE selects the frequency layer in idle mode, and the associated frequency band cannot be changed by the eNodeB using the multi-carrier operation. The following issues are preventing the NB-IoT multi-carrier operation across frequency bands:

Issue 1: The NB-IoT base station is unaware about the signal conditions at the UE. Since no measurement reporting is defined, the network is not aware about the signal conditions at the UE on different frequency layers.

Issue 2: Multi-carrier operation across different radio frequency bands is not supported. The cell-specific parameters determining the maximum allowed UE transmission power (p-Max and additionalSpectrumEmission) cannot be configured for a non-anchor carrier. When both anchor and non-anchor carriers are within different bands A and B, procedures are required to derive the initial narrowband physical uplink shared channel (NPUSCH) power on band B using the pathloss from the random access in band A.

Issue 3: A change of the radio frequency of the anchor carrier is not supported. The anchor carrier is selected by the UE during connection establishment. It cannot be changed by the network during an established connection. For 3GPP Release 13 UEs, the random-access procedure will take place on the anchor carrier, so that the multi-carrier operation cannot mitigate the congestion during random access. The NB-IoT Release 14 will define procedures to configure UEs with random access on non-anchor carriers.

Issue 4: Radio link monitoring (RLM) across different radio frequency bands is not supported. The RLM procedure only monitors the narrowband reference symbols (NRS) on two channels [Reference: [R1-1613450] WF on NB-IoT Rel-13 UE NRSRP, NRSRQ and RLM measurements, RAN1 #87 discussion]:

On the narrowband physical downlink control channel (NPDCCH) within the UE specific search space (USS), and on the narrowband physical downlink shared channel (NPDSCH) within transmissions directed towards the UE.

When operating multiple carriers in different radio frequency bands, however, the signal conditions might vary widely. A radio link failure triggered by RLM on the non-anchor carrier will initiate the connection reestablishment procedure using the default dedicated configuration regardless of the condition of the anchor carrier.

The RLM procedure is not used during the random-access procedure on the anchor carrier, so the radio link failure (RLF) can be declared only after detection of random access problems.

Issue 5: Multi-carrier operation across different NB-IoT physical cells is not supported. The multi-carrier operation in NB-IoT assumes that all carriers share the same narrowband physical layer cell identity (PCI), which renders the cell planning more difficult for the operator.

Issue 6: Multi-carrier operation across different LTE physical cells is not supported. For uplink transmissions on the narrowband physical uplink shared channel (NPUSCH), the UE has to remain silent when there are sounding reference signals (SRS) configured in the LTE mother cell as configured within srs-SubframeConfig [Reference: 3GPP TS 36.331 E-UTRA—Radio Resource Control (RRC), Release 13]. The SRS configuration of additional LTE cell having the non-anchor carrier cannot be signaled. The E-UTRA control region size of the additional LTE cell cannot be signaled, since the value eutraControlRegionSize in CarrierConfigDedicated has to be set to the anchor configuration for inband operation. When the NB-IoT anchor carrier is situated within an LTE cell, the NB-IoT UE might benefit from detection of the LTE common reference signals (CRS). Due to the missing power offset between CRS and NRS for the additional LTE cell, this is not possible on the non-anchor carrier within another LTE mother cell.

Issue 7: Multi-carrier operation on an anchor carrier is not supported. The anchor carrier in NB-IoT additionally contains synchronization signals as well as system information, which changes the scheduling of NPDCCH and NPDSCH. The presence of synchronization signals as well as the scheduling information of system information cannot be configured when adding a non-anchor carrier.

Issue 8: Multi-carrier operation across timing unsynchronized cells is not supported. A NB-IoT non-anchor carrier does not provide synchronization signals.

It is therefore the objective of the disclosure to address the above mentioned problems and to provide a method which allows efficient NB-IoT multi-carrier operation across different radio frequency bands or NB-IoT/LTE mother cells.

SUMMARY

The objective will be solved by a method for improving NarrowBand Internet of Things (NB-IoT) radio network utilization by more efficiently and flexibly allocating available frequency spectrum resources to an UE, wherein system information messages and/or dedicated signaling exchanged between an eNodeB and the UE are extended by specific parameters, setups and requests, so that multi-carrier operations are performable across all radio frequency bands even if the UE is already connected to the eNodeB.

The proposed scheme generates benefits for both base station (eNodeB) and UE side. Since the base station is now able to distribute UEs across different NB-IoT carriers and cells, the utilization of the available spectrum resources can be improved. A higher number of connected UEs can be supported when applying a load balancing at the base station. At the same time, the proposal retains the full flexibility within the cell and frequency planning since all parts of the full physical configuration for the added carrier can be provided to the UE.

On the UE side, the load balancing generally reduces the network congestion, i.e. the network access delay as well as the scheduling latency will be improved. Thus, the UE can achieve higher throughputs, but more importantly, the energy consumption is reduced and the battery lifetime is prolonged. Compared to connected mode mobility via measurement reporting and handover control from network side, the complexity of the proposed scheme is substantially lower.

In a preferred embodiment of the inventive method, the UE, which tries to connect to a first radio frequency band, provides measurement results obtained in idle mode to the eNodeB, whereas the measurement results comprise information about quality of cells that have been found on other radio frequency bands that are supported by the eNodeB.

This has the advantage that a higher number of connected UEs can be supported when applying a load balancing at the base station. And at the same time, on the UE side, the load balancing generally reduces the network congestion, i.e. the network access delay as well as the scheduling latency will be improved.

In another preferred embodiment of the inventive method, the eNodeB uses the measurement information in order to allocate and configure the UE to another radio frequency band to optimize signal conditions on both the eNodeB and UE side, whereas the UE sends a connection setup completed message from the allocated other radio frequency band to the eNodeB.

During connection establishment, connection resume and connection reestablishment, the UE is providing (a limited set of) measurement results obtained in idle mode to the network. The UE can obtain the frequency layers of interest from the SystemInformationBlockType3-NB, SystemInformationBlockType4-NB and SystemInformationBlockType5-NB. Within the list of measurement reports, unsuitable results might be filtered, e.g. by applying the cell selection criterion [Reference: 3GPP TS 36.304 E-UTRA—User Equipment (UE) procedures in idle mode, Release 13] first.

In FIG. 1, the use case of connection establishment is illustrated. Using the proposed solution, the UE additionally reports the quality of cells to the network that have been found on other frequency layers. The RRCConnectionRequest message is used for that purpose. Using the information about the signal conditions at the UE, the base station is able to configure the UE with an additional NB-IoT carrier using the RRCConnectionSetup message. Within a typical IoT application, the traffic pattern generally consists of the exchange of a small number of messages. Thus, reporting the measurement results once during the start of a connection is sufficient for most IoT applications.

In a further preferred embodiment of the inventive method, the system information messages broadcasted by the eNodeB to the UE is extended by a parameter to tell the UE an expected transmission power of the other radio frequency bands by the eNodeB, whereas the UE calculates a pathloss and adapts the transmission power accordingly.

The configuration of the maximum transmission power as well as the configuration of NPUSCH reference signals and uplink power control of the added NB-IoT carrier is provided to the UE using dedicated signaling. The configuration is optional, and the configuration of the anchor carrier shall be used when no configuration is provided by the network.

When using a different radio frequency band for NPUSCH, the pathloss might differ vastly. In order to account for the differences, the pathloss $PL_c$ used in the calculation of $P_{NPUSCH,c(i)}$ in [Reference: 3GPP TS 36.321 E-UTRA—(MAC) protocol specification, Release 13, chap. 16.2.1.1.1] shall consider the NRS power and NRSRP from the carrier where the NPUSCH transmission will take place.

For the connection establishment use case shown in FIG. 1, the newly configured NB-IoT carrier C is used first for the transmission of the RRCConnectionSetupComplete in message 5. For the carrier C, NRSRP measurements are available from idle mode. All further configurations required for the NPUSCH power calculation is provided to the UE within the RRCConnectionSetup message, if different from the anchor configuration. This includes the cell specific maximum transmission power p-Max, the NRS power as well as UplinkPowerControlCommon-NB. So, all carriers should apply the same common (cell-specific) configuration of NPUSCH reference signals (in npusch-ConfigCommon) as well as uplink power control (in uplinkPowerControlCommon).

In an embodiment of the inventive method, if the UE is connected to a first anchor carrier of the first radio frequency band and the UE is allocated to the other radio frequency band the eNodeB reconfigures the dedicated anchor carrier to the allocated other radio frequency band.

The configuration of the radio frequency of the new anchor carrier is provided to the UE using dedicated signaling. In addition, the common configuration of the new anchor carrier is provided to the UE, either as a differential or a full reconfiguration. For the connection establishment use case in FIG. 1, the network could additionally reconfigure the anchor carrier of the considered UE within another radio frequency band along with the required common configuration. For the network, the reconfiguration of the anchor carrier has the benefit that the eNodeB can also control the band for the random access of the connected UEs not supporting 3GPP Release 14. For the UE, on the other hand, changing the anchor carrier to the radio frequency band of the non-anchor has the benefit of better pathloss estimation, since more NRS resources will be available.

In another embodiment of the inventive method, a radio link monitoring procedure is established within an additional signaling exchanged by the UE and the eNodeB, whereas the UE informs the eNodeB about a radio link failure on a non-anchor carrier and the eNodeB reconfigure the UE and release the non-anchor carrier or redirect the UE to another radio frequency band.

If the radio link failure (RLF) occurs on a non-anchor carrier while the anchor is still operational, an additional signaling can be introduced e.g. within random access message 3 to inform the base station about the radio failure. On reception, the network might trigger a connection reconfiguration to de-configure the non-anchor carrier, which is not functional anymore. In FIG. 2, the use case of radio link failure (RLF) on the non-anchor carrier is shown. Since the anchor carrier is still operational, no reestablishment is triggered. Instead, the UE informs the network about the RLF using a newly defined MAC control element (CE) together with the C-RNTI MAC CE in message 3. On reception, the network might reconfigure the UE and release the non-anchor carrier, or it might release the connection and redirect the UE to another frequency layer. When the UE is within the random-access procedure on the anchor carrier, radio link monitoring is introduced on the Type-2 Common Search Space of NPDCCH. The rationale is to speed up the detection of a radio link failure on the anchor carrier before the random-access problem is declared in order to save battery power.

In another embodiment of the inventive method, the additional signaling exchanged by the UE and the eNodeB is further extended by a configuration of a narrowband physical cell identity which is provided to the UE by the eNodeB so that multi-carrier operations across different LTE physical cells are supported. The configuration of the physical cell identity of the NB-IoT cell that is added as additional carrier is provided to the UE using dedicated signaling.

Furthermore, the additional signaling exchanged by the UE and the eNodeB is further extended by parameters such as a physical cell identity of a LTE mother cell, its SRS configuration, a E-UTRA control region size and a power offset between CRS and NRS so that a multi-carrier operation across different LTE physical cells is supported. The dedicated configuration of the added NB-IoT carrier towards the UE is extended with the optional configuration for the added NB-IoT carrier: the physical cell identity of the LTE mother cell, its SRS configuration, the E-UTRA control region size and the power offset between CRS and NRS. When the NB-IoT anchor carrier is situated within an LTE cell, and the eNodeB provides additional configuration parameters of the LTE cell, the NB-IoT UE benefits from detection of the LTE common reference signals (CRS) and the information about the power offset between CRS and NRS for the additional LTE cell, which makes multi-carrier operation also possible on the non-anchor carrier within another LTE mother cell. This has the advantage that the reference symbols of the LTE mother cell can be used for channel estimation. This way, the accuracy of the channel estimation can be improved, which increases the performance of the NB-IoT downlink receiver.

In another embodiment of the inventive method, the additional signaling exchanged by the UE and the eNodeB is further extended by a parameter to indicate to the UE that an added carrier is an anchor carrier. The configuration of the added NB-IoT carrier is extended with optional configuration indicating that the added carrier is an anchor carrier. In that case, the scheduling information of the system information is additionally provided within the dedicated configuration. This has the advantage that the base station has more flexibility when scheduling users, which increases the overall capacity and mitigates congestion.

Moreover, in a further embodiment of the inventive method, the additional signaling exchanged by the UE and the eNodeB is further extended by timing information of an anchor carrier of the first radio frequency band which is used by the UE allocated to the other radio frequency band for synchronization so that a multi-carrier operation across timing unsynchronized cells is supported. In other words, the configuration of the added NB-IoT carrier is extended with optional configuration of an anchor carrier within the radio frequency band of the NB-IoT carrier to be added. The NB-IoT time (hyperframe, frame, subframe) is provided within the dedicated signaling, whereas the UE is using the synchronization signals of the provided anchor carrier to estimate the fine sample timing. Thus, the timing of uplink and downlink on the non-anchor carrier is synchronized to the anchor carrier. As a special case, the anchor carrier provided for timing synchronization can also refer to the added NB-IoT carrier itself.

The proposed solution covers a variety of use cases. The propagation delay of collocated cells might differ due to the usage of different bands. The base station might employ remote radio heads, where bands are mapped differently. Furthermore, the proposed solution also covers the use case of non-collocated NB-IoT cells with asynchronous timing.

BRIEF DESCRIPTION OF DRAWINGS

The disclosure will be explained in more detail using exemplary embodiments.

The appended drawings show

DETAILED DESCRIPTION OF THE EMBODIMENTS

Figure 1:
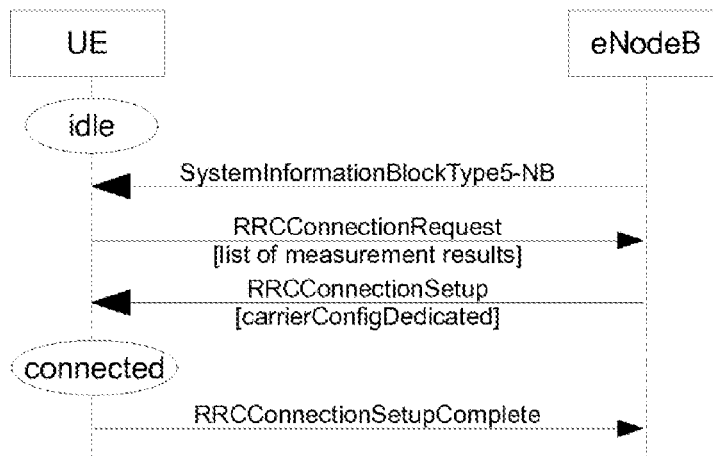
FIG. 1 Use case measurement reporting during connection establishment.

In FIG. 1, the use case of connection establishment is illustrated. Using the proposed solution, the UE additionally reports the quality of cells to the network that have been found on other frequency layers. The RRCConnectionRequest message is used for that purpose. Using the information about the signal conditions at the UE, the base station is able to configure the UE with an additional NB-IoT carrier using the RRCConnectionSetup message. Within a typical IoT application, the traffic pattern generally consists of the exchange of a small number of messages. Thus, reporting the measurement results once during the start of a connection is sufficient for most IoT applications.

For the connection establishment use case in FIG. 1, the network could additionally reconfigure the anchor carrier of the considered UE within another radio frequency band along with the required common configuration. For the network, the reconfiguration of the anchor carrier has the benefit that the eNodeB can also control the band for the random access of the connected UEs not supporting 3GPP Release 14. For the UE, on the other hand, changing the anchor carrier to the radio frequency band of the non-anchor carrier has the benefit of better pathloss estimation, since more NRS resources will be available.

Figure 2:
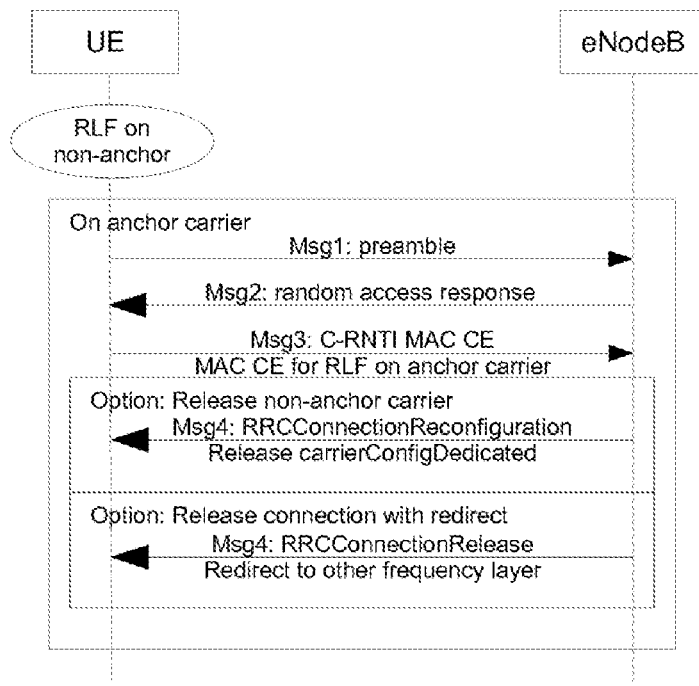
FIG. 2 Use case radio link failure on non-anchor carrier with recovery on anchor carrier.

In FIG. 2, the use case of radio link failure (RLF) on the non-anchor carrier is shown. Since the anchor carrier is still operational, no reestablishment is triggered. Instead, the UE informs the network about the RLF using a newly defined MAC control element (CE) together with the C-RNTI MAC CE in message 3. On reception, the network might reconfigure the UE and release the non-anchor carrier, or it might release the connection and redirect the UE to another frequency layer.

When the UE is within the random-access procedure on the anchor carrier, radio link monitoring is introduced on the Type-2 Common Search Space of NPDCCH. The rationale is to speed up the detection of a radio link failure on the anchor carrier before the random-access problem is declared in order to save battery power.

What is claimed is:

1. A method for improving NarrowB and Internet of Things (NB-IoT) radio network utilization, comprising:
   establishing a connection procedure between a base station (eNodeB), and a user equipment (UE), the UE trying to connect to a first radio frequency band, wherein the eNodeB sends a SystemInformationBlockType5-NB message comprising other radio frequency bands of interest that are supported by the eNodeB, to the UE, and the UE sends a RRCConnectionRequest message comprising information about signal conditions of cells that have been found on the other radio frequency bands at the UE provided by measurement results obtained in idle mode, back to the eNodeB, and the eNodeB configures the UE with an additional NB-IoT carrier using a RRCConnectionSetup message, so that multi-carrier operations are performable across the other radio frequency bands, that are supported by the eNodeB;
   wherein a radio link monitoring procedure is established within an additional signaling exchanged by the UE and the eNodeB, and the UE informs the eNodeB about a radio link failure on a non-anchor carrier by using a newly defined MAC control element together with a C-RNTI MAC CE in message 3 and the eNodeB reconfigures the UE and releases the non-anchor carrier or redirects the UE to another radio frequency band.

2. The method for improving NB-IoT radio network utilization according to claim 1, wherein the eNodeB uses the measurement results contained in the RRCConnectionRequest message sent from the UE to the eNodeB to allocate and configure the UE to another radio frequency band to optimize signal conditions on both the eNodeB and UE side, wherein the UE sends a connection setup completed message from the allocated other radio frequency band to the eNodeB.

3. The method for improving NB-IoT radio network utilization according to claim 1, wherein system information messages broadcast by the eNodeB to the UE are extended by a parameter to tell the UE an expected transmission power of the other radio frequency bands by the eNodeB, and wherein the UE calculates a pathloss and adapts the transmission power accordingly.

4. The method for improving NB-IoT radio network utilization according to claim 1, further comprising improving the NB-IoT radio network utilization by allocating available frequency spectrum resources to the UE, and system information messages and/or dedicated signaling exchanged between the eNodeB and the UE are extended by specific parameters, setups and requests, so that the multi-carrier operations are performable across all radio frequency bands even if the UE is already connected to the eNodeB.

5. The method for improving NB-IoT radio network utilization according to claim 1, wherein the measurement results comprise information about quality of cells that have been found on the other radio frequency bands that are supported by the eNodeB.

6. The method for improving NB-IoT radio network utilization according to claim 1, wherein a configuration of a maximum transmission power as well as a configuration of narrowband physical uplink shared channel (NPUSCH) reference signals and uplink power control of an added NB-IoT carrier is provided to the UE using dedicated signaling.

7. The method for improving NB-IoT radio network utilization according to claim 6, wherein all carriers apply the same common configuration of NPUSCH reference signals as well as uplink power control.

8. The method for improving NB-IoT radio network utilization according to claim 1, wherein a configuration of a radio frequency of a new anchor carrier is provided to the UE using dedicated signaling, and a common configuration of the new anchor carrier is provided to the UE, either as a differential or a full reconfiguration.

9. The method for improving NB-IoT radio network utilization according to claim 1, wherein when the UE is connected to a first anchor carrier of the first radio frequency band and the UE is allocated to the other radio frequency band, the eNodeB reconfigures the first anchor carrier to the allocated other radio frequency band.

10. The method for improving NB-IoT radio network utilization according claim 1, wherein when the radio link failure occurs on the non-anchor carrier while an anchor is still operational, the additional signaling is introduced and within random access message 3 to inform a base station about a radio failure.

11. The method for improving NB-IoT radio network utilization according to claim 10, wherein on reception of the radio failure, a network triggers a connection reconfiguration to de-configure the non-anchor carrier, which is not functional anymore.

12. The method for improving NB-IoT radio network utilization according to claim 1, wherein when the UE is within a random-access procedure on an anchor carrier, radio link monitoring is introduced on a Type-2 Common Search Space of NPDCCH.

13. The method for improving NB-IoT radio network utilization according to claim 1, further comprising speeding up a detection of the radio link failure on an anchor carrier before a random-access problem is declared in order to save battery power.

14. The method for improving NB-IoT radio network utilization according to claim 1, wherein the additional signaling exchanged by the UE and the eNodeB is further extended by a configuration of a narrowband physical cell identity which is provided to the UE by the eNodeB so that multi-carrier operations across different LTE physical cells are supported.

15. The method for improving NB-IoT radio network utilization according to claim 1, wherein the additional signaling exchanged by the UE and the eNodeB is further extended by parameters so that a multi-carrier operation across different LTE physical cells is supported.

16. The method for improving NB-IoT radio network utilization according to claim 15, wherein the parameters are at least one of a physical cell identity of an LTE mother cell, an SRS configuration, an E-UTRA control region size, and a power offset between CRS and NRS.

17. The method for improving NB-IoT radio network utilization according to claim 15, wherein when am NB-IoT anchor carrier is situated within an LTE cell, and the eNodeB provides additional configuration parameters of the LTE cell, the NB-IoT UE benefits from detection of LTE common reference signals (CRS) and information about the power offset between CRS and NRS for additional LTE cell, enabling multi-carrier operation on the non-anchor carrier within another LTE mother cell.

18. The method for improving NB-IoT radio network utilization according to claim 1, wherein the additional signaling exchanged by the UE and the eNodeB is further extended by a parameter to indicate to the UE that an added carrier is an anchor carrier.

19. The method for improving NB-IoT radio network utilization according to claim 1, wherein the additional signaling exchanged by the UE and the eNodeB is further extended by timing information of an anchor carrier of the first radio frequency band which is used by the UE allocated to the other radio frequency band for synchronization so that a multi-carrier operation across timing unsynchronized cells is supported.

* * * * *